United States Patent Office
3,103,768
Patented Sept. 17, 1963

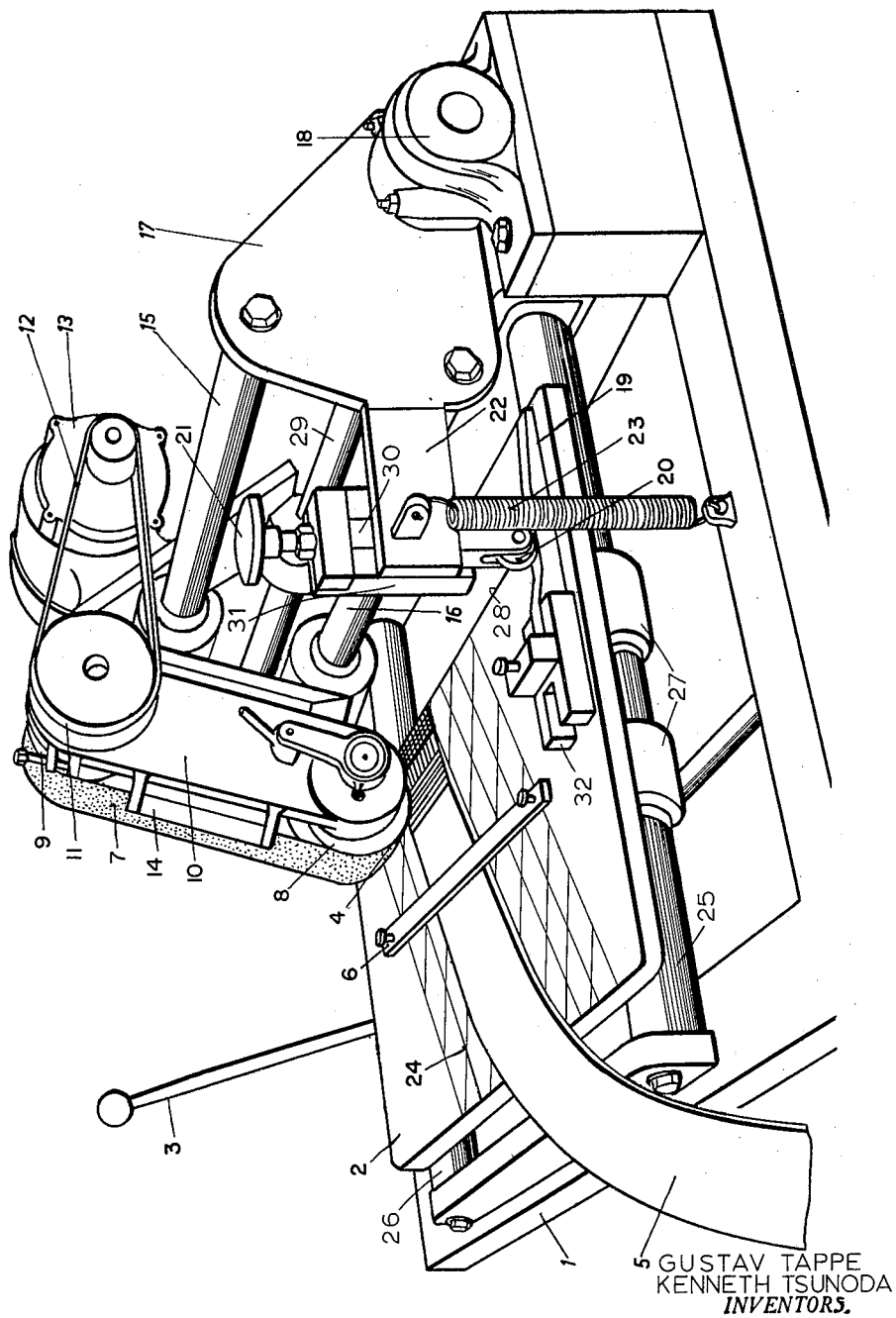

3,103,768
APPARATUS FOR SHAPING THE EDGES OF
FLAT WORKPIECES
Kenneth Tsunoda, New York, N.Y., and Gustav Tappe,
Hannover, Germany, assignors to Geweka A.G., Zug,
Switzerland, a corporation of Switzerland
Filed Sept. 18, 1961, Ser. No. 138,825
Claims priority, application Germany Sept. 17, 1960
1 Claim. (Cl. 51—142)

Our present invention relates to an apparatus for shaping the edges of flat workpieces, particularly but not exclusively of belts whose ends are to be ground or milled into wedge shape, preparatorily to splicing, whereby these belts can be formed into endless transmission or conveyor bands.

The wedge shape necessary to produce a smooth lap joint between the spliced belt ends cannot be obtained by a simple beveling operation in the case of modern composite belts which consist of several layers laminated together. Thus, it is present practice to provide particularly transmission belts with a friction layer, e.g. of split chrome leather, and with at least one reinforcing layer designed to withstand the large peripheral stresses which the belt must sustain; the last-mentioned layer is frequently made of a stretched superpolyamide (nylon). In many instances a third layer, e.g. of textile fabric, is present on the side opposite the friction layer to protect the reinforcing layer against dehydration and/or to strengthen it in transverse direction.

A perfect lap joint between two ends of multilayer belt portions requires a different wedge angle for each layer. Thus, such angle should be relatively small in the case of the polyamide layer whose thickness, even in heavy-duty belts, rarely exceeds one or two millimeters; the small angle provides a sufficiently large surface for effective bonding. The friction layer of skiver and the protective textile layer, on the other hand, can be bonded in satisfactory manner with smaller overlap so that correspondingly steeper bevels may be used for them, thereby foreshortening the entire joint and improving the flexibility of the belt at the juncture.

The more or less abrupt transition between different bevels results in an angular profile which is usually unsymmetrical since the thicknesses of the several layers may vary greatly among one another; the frictional layer is usually considerably heavier than the reinforcing layer which in turn may be of greater thickness than the protective layer inasmuch as the latter is not intended to contribute materially to the transmission of peripheral forces. Thus, the complementary profiles to be provided on the two belt ends to be spliced are generally different from each other. These profiles have heretofore been produced manually, by running each belt end over a fixedly positioned grindstone or other abrading device; such work evidently proceeds rather slowly, since it has to be tested repeatedly against suitable templates, and its result depends on the skill of the individual operator.

It is, therefore, the general object of our present invention to provide an apparatus for at least semi-automatically machining the edges of belts and other workpieces in a manner insuring the formation of a desired profile which can thus be reproduced by unskilled personnel an infinite number of times, thereby enabling the serial manufacture of high-quality endless belts and the like.

The foregoing object is realized, in accordance with our present invention, by the provision of a base and a support movable relatively to each other, the base being preferably in the form of a table to which the end of a belt or an edge portion of some other workpiece to be machined can be fastened; the support carries a machining device for milling, grinding or otherwise shaping the workpiece edge according to a predetermined profile. The relative displacement between the support and the base may be effected manually in two dimensions, generally within a horizontal plane above the table surface, and is positively controlled in a direction substantially perpendicular to that surface by a suitable guide element carried on the base and cooperating with the support. The guide element, which may be a camming strip, is preferably removably mounted on the base so as to enable its replacement for the formation of different profiles.

In an advantageous embodiment, in which the support forms a track across the table along which a carriage holding the machining device is reciprocable, the table itself is adapted to be displaced toward and away from the support in a direction transverse to the track. In that case we prefer to provide the table with sets of linear markings extending at equal and opposite angles to the direction of table movement whereby, if the terminal belt portion to be machined is aligned with one or the other set of markings, the joint will run obliquely to the main direction of the belt for further improving the continuity of the resulting element. The angle included between the belt and the direction of table motion will normally be less than 45°, preferably of the order of 30°; the camming strip, positioned to extend in the direction of table motion, will include a like angle with the belt.

The invention will be described in greater detail with reference to the accompanying drawing whose sole figure illustrates an embodiment in perspective view.

The apparatus shown in the drawing comprises a frame 1 with two longitudinal rods 25, 26 on which a table 2, embracing these rods by means of sleeves 27, is slidable under the control of a lever 3 suitably articulated, in known manner not further illustrated, to both the frame and the table. A terminal portion of a multilayer belt 5 is fastened by a clamping strip 6 to the surface of table 2 so as to lie at an acute angle to the direction of reciprocation of the table along the rods 25, 26; this position is determined by two intersecting sets of engraved lines 24 including an angle of approximately 30° with the direction of reciprocation. The end 4 of the belt, which is to be given the desired wedge shape, lies flush with a transverse line 28 also engraved on the table surface.

The machining device proper comprises an endless abrasive belt 7 which embraces an idler roller 8 and a roller 9 driven by an electromotor 13 via a belt 12 and a sheave 11. This unit is mounted on a carriage 10 which is reciprocable, in a direction transverse to the rods 25 and 26, along a track formed by two rails 15 and 16. A handle 14 on carriage 10 enables its displacement along the rails 15 and 16 which, together with generally triangular end elements 17, form a support pivotable about a shaft 29 parallel to these rails. Shaft 29 is journaled in stationary bearings 18 on opposite sides of the support 15–17. At least one end element 17 is provided with an extension arm 22 to which a contractile spring 23, also anchored to the frame 1, is attached. A roller 20 is rotatably supported on the lower end of a vertical slide 30 which is held in a mount 31 on arm 22 and whose vertical position may be adjusted with the aid of a handwheel 21. Roller 20 bears upon a camming strip 19 which is removably clamped in a holder 32 to the surface of table 2 so as to lie parallel to the rods 25 and 26.

In operation, a workman reciprocates the carriage 10 along the rails 15, 16 while progressively displacing the table 2 along rods 25, 26 with the aid of lever 3. The elevation of the abrasive band 7 above the surface of table 2 is automatically controlled by the roller 20 acting against the spring 23; this elevation, determined by the shape of camming strip 19, furnishes the desired profile of belt end 4. The complementary belt end may then be produced by substituting a corresponding strip for cam 19 and placing the terminal belt portion to be so shaped on the table 2 in a position symmetrical to that shown for the belt portion 5.

It will be apparent that the apparatus described and illustrated may be modified in various ways, e.g. with regard to the mechanism used for bringing about the relative displacement between the tool support 10 and the workpiece holder 2, without departing from the spirit and scope of the invention as defined in the appended claim.

We claim:

An apparatus for skiving the edges of flexible belts prior to the lapping thereof, comprising a support, a table horizontally reciprocable on said support and having a horizontal workpiece-receiving surface, fastening means upon said receiving surface for securing thereto an edge portion of a belt to be skived, a carriage mounted on said support above said surface for displacement in a direction transverse to the direction of reciprocation of said table, said support including a substantially horizontal pivot carrying said carriage with freedom of angular displacement about an axis parallel to the direction of displacement of the carriage, abrasive-belt means mounted on said carriage and engageable with said edge portion, means on said carriage for driving said abrasive-belt means, a longitudinally contoured elongated cam removably mounted on said surface and extending in the direction of reciprocation of said table for determining the configuration of said edge portion upon engagement of said abrasive-belt means therewith, spring means biasing said carriage downwardly toward said surface, and cam-follower means operatively connected with said carriage above said surface in alignment and urged into engagement with said cam in all operative positions of said carriage for controlling the elevation of said abrasive-belt means above said surface.

References Cited in the file of this patent
UNITED STATES PATENTS

| | | |
|---|---|---|
| 504,006 | Vogel | Aug. 29, 1893 |
| 2,890,549 | Frentzel | June 16, 1959 |